United States Patent
Houdayer et al.

(10) Patent No.: US 8,596,878 B2
(45) Date of Patent: Dec. 3, 2013

(54) ROLLING BEARING AND THRUST BEARING ASSEMBLY COMPRISING SAID ROLLING BEARING

(75) Inventors: Christophe Houdayer, Semblancay (FR); Sylvain Bussit, Mohnale (FR); Richard Corbett, Fondettes (FR); Samuel Viault, Tours (FR); Bruno Montboeuf, Cerelles (FR)

(73) Assignee: Aktiebolaget SKF, Göteborg (SE)

( * ) Notice: Subject to any disclaimer, the term of this patent is extended or adjusted under 35 U.S.C. 154(b) by 184 days.

(21) Appl. No.: 13/132,230

(22) PCT Filed: Dec. 1, 2008

(86) PCT No.: PCT/EP2008/066503
§ 371 (c)(1),
(2), (4) Date: Aug. 17, 2011

(87) PCT Pub. No.: WO2010/063305
PCT Pub. Date: Jun. 10, 2010

(65) Prior Publication Data
US 2011/0293214 A1 Dec. 1, 2011

(51) Int. Cl.
*F16C 33/46* (2006.01)
*F16C 33/58* (2006.01)
*F16C 33/76* (2006.01)

(52) U.S. Cl.
USPC ............................. 384/607; 384/614; 384/615

(58) Field of Classification Search
USPC .................... 384/420, 606–610, 612–617
See application file for complete search history.

(56) References Cited

U.S. PATENT DOCUMENTS

| | | | | |
|---|---|---|---|---|
| 4,699,530 | A | * | 10/1987 | Satoh et al. .................. 384/609 |
| 4,948,272 | A | | 8/1990 | Stowe |
| 6,186,507 | B1 | | 2/2001 | Oldenburg |
| 6,296,396 | B1 | * | 10/2001 | Schwarzbich ............... 384/607 |
| 2008/0219610 | A1 | | 9/2008 | Nakatani et al. |
| 2008/0310780 | A1 | * | 12/2008 | Watai et al. ................... 384/420 |

FOREIGN PATENT DOCUMENTS

| | | | |
|---|---|---|---|
| DE | 102006057559 A1 | 6/2008 | |
| EP | 1000781 A1 | 5/2000 | |
| EP | 1988147 A1 | 11/2008 | |
| FR | 2920700 A1 | 3/2009 | |
| JP | 2004263771 A | 9/2004 | |
| JP | 2006322505 A | 11/2006 | |
| WO | WO 2006043566 A1 | * | 4/2006 |

OTHER PUBLICATIONS

Product Description Fact Sheet ("Beacon 325 from Exxon") ExxonMobil Lubricants and Specialists 2007 Exxon Mobil Corporation.
Reference Number: ISO 2137:2007 (E) Petroleum Products and Lubricants-Determination of Cone Penetration of Lubricating Greases and Petrolatum ISO Copyright Office, Switzerland 2007.

* cited by examiner

*Primary Examiner* — Phillip A Johnson
(74) *Attorney, Agent, or Firm* — Bryan Peckjian; SKF USA Inc. Patent Department

(57) ABSTRACT

The invention relates to a rolling bearing 1 comprising a lower ring 3 mounted inside a lower annular cup 6, an upper ring 2 mounted inside an upper annular cup 7, and at least one row of rolling elements 4 positioned between raceways defined by lower and upper rings. One of the annular cups has at least one annular skirt 6d partly inserted within at least one annular groove 7m provided in the other annular cup, thus forming a sinuous chamber 8, and the sinuous chamber is at least partly filled with at least one waterproof grease material 9.

8 Claims, 3 Drawing Sheets

ROLLING BEARING AND THRUST BEARING ASSEMBLY COMPRISING SAID ROLLING BEARING

CROSS REFERENCE TO RELATED APPLICATIONS

Figure 1:
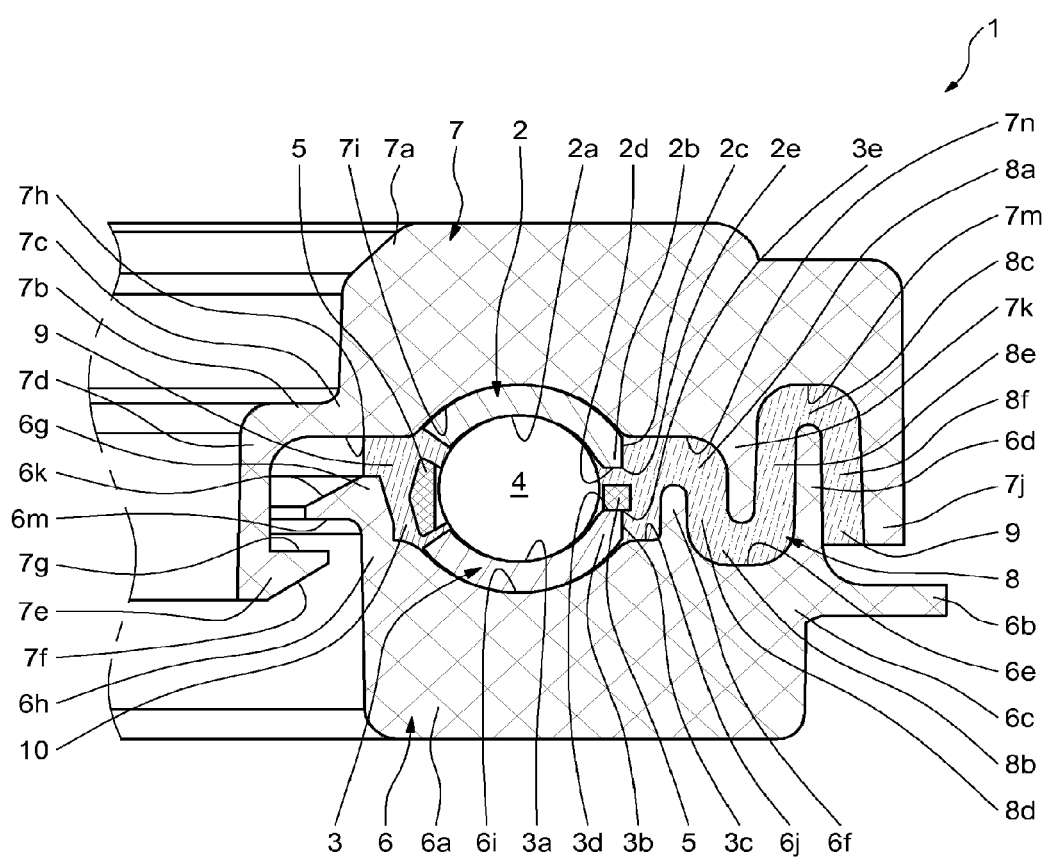

This application is a §371 National Stage Application of International Application No. PCT/EP08/66503, filed on Dec. 1, 2008.

BACKGROUND OF THE INVENTION

The present invention relates to the field of rolling bearings and of thrust bearing assemblies used, in particular, in motor vehicles with telescopic suspensions of steering wheels.

A thrust bearing assembly usually includes an upper ring and a lower ring between which are mounted rolling elements, for example balls or rollers.

A thrust bearing assembly is usually placed at the top of the suspension assembly, between a lower metal cup that also acts as a seat for a suspension spring, and an upper element secured to the vehicle body. The spring of the suspension device is installed around the rod of the damper piston whose end is secured to an elastic support block. The thrust bearing assembly allows a rotating motion between the spring cup, able to rotate, and the elastic support block that is attached to the vehicle body. The relative angular movement between the spring cup and the elastic block is the result of a turning of the steering wheel and/or the compression of the suspension spring.

The thrust bearing also transmits axial forces between the spring and the vehicle body.

EP 1 000 781 discloses a thrust bearing in which the rolling bearing comprises two rings and seals for sealing the gap between the rings.

U.S. Pat. No. 6,186,507 discloses a rotary shaft with sealing means comprising axial and radial contacting lips.

WO 07/037308 discloses a rolling bearing in which the sealing means comprise contacting lips and waterproof grease.

However, the bearing seals thus obtained are not satisfactory. Specifically, the contacting lips create a friction between the two parts of the rolling bearing. On the other hand, the rolling bearings are situated under the vehicle body and in the near vicinity of the wheels which, particularly during rainy weather, splash pollutants likely to enter the bearing, and pollution of the bearing by external elements may, in the long run, adversely affect the operation of the bearing.

SUMMARY OF THE INVENTION

One aim of the invention is to provide a rolling bearing that is very tightly sealed while limiting rotational friction.

The invention also seeks to provide a rolling bearing with a high degree of imperviousness that may easily be assembled, cannot be dismantled and is cheap to manufacture.

According to an embodiment, a rolling bearing comprises a lower ring mounted inside a lower annular cup, an upper ring mounted inside an upper annular cup, and at least one row of rolling elements positioned between raceways defined by lower and upper rings. One of the annular cups has at least one annular skirt partly inserted within at least one annular groove provided in the other annular cup, thus forming a sinuous chamber. The sinuous chamber is at least partly filled with at least one waterproof grease material.

The combination of both the waterproof grease material and a sinuous chamber (or labyrinth seal) makes possible to obtain a very tightly sealed rolling bearing, without contacting lips. Therefore, the friction between the two parts of the rolling bearing is reduced, and the watertightness improved.

The upper cup and the lower cup define an internal space in which the upper ring and lower ring are located, the sinuous chamber forming an extension from the internal space extending radially outward.

The sinuous chamber forming an extension from the internal space, it is possible to add a lubricant, such as a lubricating grease material in the internal space, after the rolling bearing is mounted, but before the addition of the waterproof grease material.

In a preferred embodiment, one of the annular cups comprises a cylindrical portion extending radially outward, and the other annular cup comprises an outer skirt extending axially toward the cylindrical portion and radially limiting the sinuous chamber, the cylindrical portion and the outer skirt defining an opening of the sinuous chamber.

In an embodiment, one of the annular cups comprises an internal skirt extending axially toward the other cup and separating the sinuous chamber from the internal space. The internal skirt may partly separate the internal space from the sinuous chamber, thus easing the filling of the rolling bearing with two kinds of greases: a lubricating grease and a waterproof grease material. Moreover, the internal skirt may reduce the mix of the two greases, inside the rolling bearing.

One of the annular cups may comprise a first flange radially extending inward, toward an inner skirt of the other cup, the inner skirt comprising a second flange radially extending outward and cooperating with the first flange to keep the rolling bearing assembled.

In one embodiment, the internal space may comprise lubricating grease to lubricate the raceways of the upper and lower rings.

In one embodiment, the waterproof grease material and the lubricating grease are the same grease.

The waterproof grease material may fill the sinuous chamber from the extremity of the internal skirt to the extremity of the outer skirt.

Alternatively, the waterproof grease material may fill the sinuous chamber from the extremity of the internal skirt to the extremity of the outer skirt.

Advantageously, the worked penetration of a standardized cone according to the norm ISO 2137: 2007, in the waterproof grease material is of at most 295 1/10 mm, for an NLGI grade 2 waterproof grease.

The norm ISO 2137:2007 specifies several methods for the empirical estimation of the consistency of greases, by measuring the penetration of a standardized cone. In particular, the weight of the cone is 102.5 g.

Advantageously, the waterproof grease material (for instance the BEACON 325 from Exxon) comprises a waterproof additive chosen among the following additives: PTFE (polytetrafluoroethylene), fluorine-based agent, silicone-based agent, calcium stearate, metal soap, as defined for instance in US 2008/0219610.

A rolling bearing as previously mentioned can be best used in a thrust bearing assembly for a vehicle suspension.

BRIEF DESCIPTION OF THE SEVERAL VIEWS OF THE DRAWINGS

Figure 2:
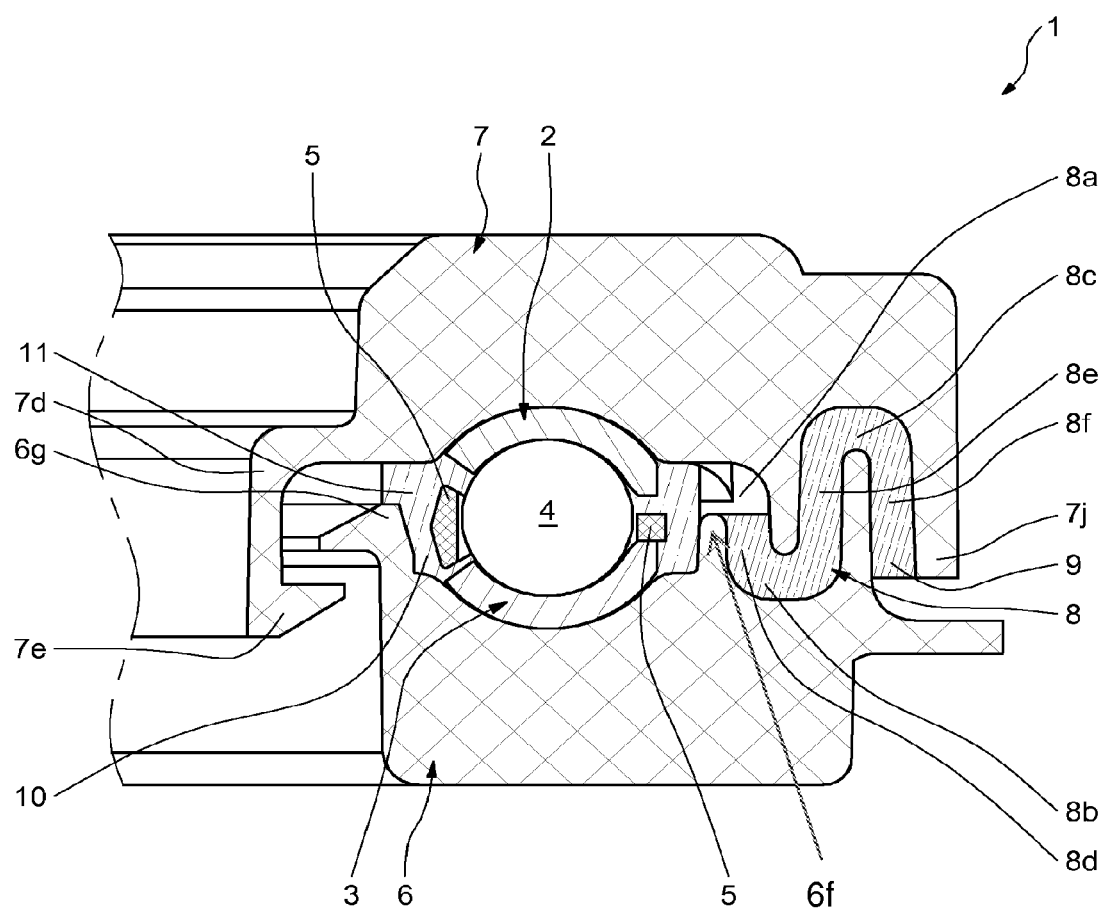
Figure 3:
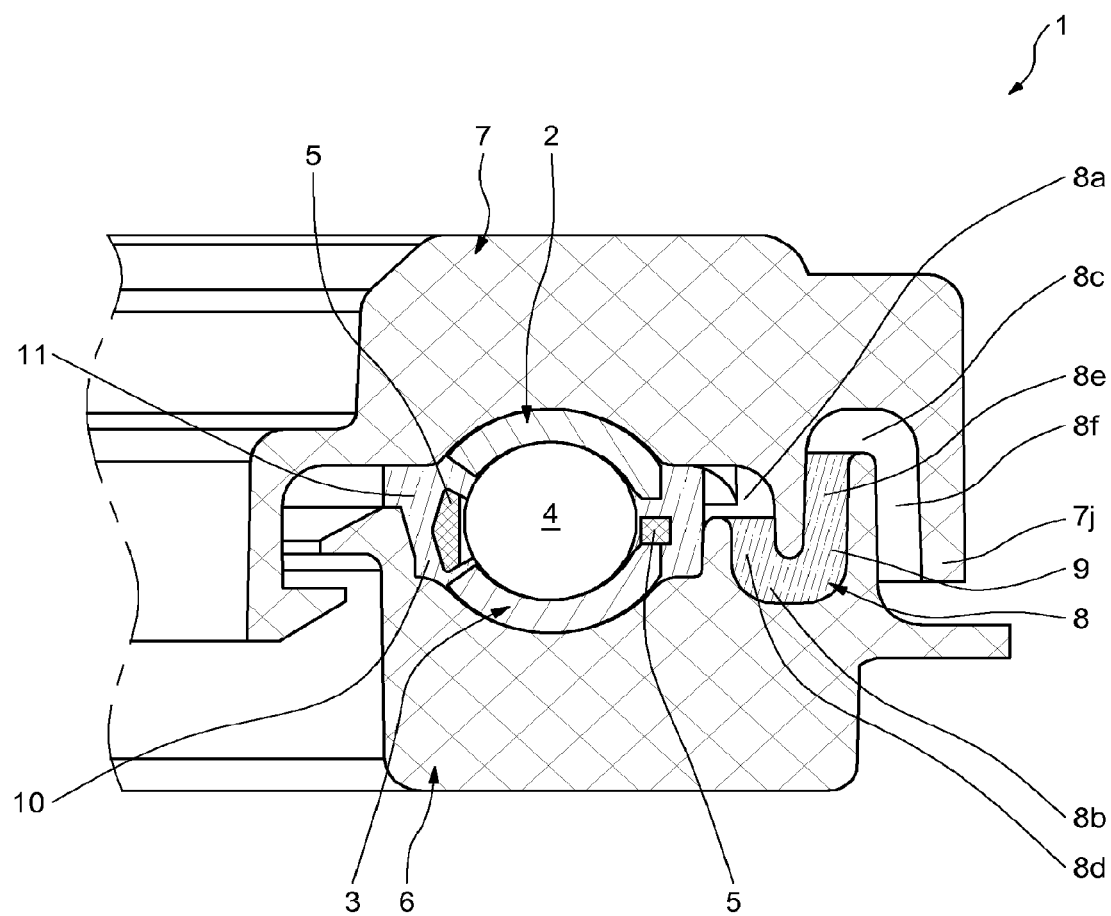

The present invention and its advantages will be better understood by studying the detailed description of some embodiments taken as non-limiting examples and illustrated by the appended drawings wherein:

FIGS. 1 to 3 are half-views in axial section of a rolling bearing according to various embodiments of the invention.

DETAILED DESCRIPTION OF THE INVENTION

As illustrated in FIG. 1, the rolling bearing 1 includes an upper ring 2 and a lower ring 3, between which are housed rolling elements 4, balls in this instance, retained circumferentially, regularly spaced by a cage 5 of synthetic material. The upper ring 2 and lower ring 3 may be formed from a steel plate by cutting and pressing.

The upper ring 2 includes a toroidal portion 2a having in cross section an internal concave quarter circle profile suitable for forming a toroidal raceway for the balls 4. The toroidal portion 2a is extended outward by an end portion 2b comprising an axial surface 2c and a radial surface 2d, intersecting at 2e.

The lower ring 3 includes a toroidal portion 3a having in cross section an internal concave quarter circle profile suitable for forming a toroidal raceway for the balls 4. The toroidal portion 3a is extended outward by an end portion 3b comprising an axial surface 3c and a radial surface 3d, intersecting at 3e.

The rolling bearing 1 includes a lower annular cup 6 and an upper annular cup 7 of synthetic material such as a glass-fiber-filled polyamide.

The lower cup 6 includes a thick portion 6a extended radially outward by a cylindrical portion 6b, from the outer top 6c of the thick portion 6a, and a skirt 6d extended axially toward the upper cup 7, from the outer top 6c of the thick portion 6a. The lower cup 6 also includes a lower groove 6e oriented toward the upper cup 7, and formed between the skirt 6d and an internal skirt 6f. The lower cup 6a includes a flange 6g extending radially inward, from the inner top 6h of the thick portion 6a, and a toroidal internal surface 6i having, in cross section, a concave profile oriented toward the upper cup 7. The flange 6g is connected to the internal skirt 6f by the internal surface 6i and by a radial surface 6j oriented toward the upper cup 7 and connecting the internal surface 6i to the internal skirt 6f. The flange 6g comprises a frusto-conical surface 6k facing upward and a cylindrical flange 6m extending radially inward. Furthermore, the tip of the internal skirt 6f may be as high as, lower or higher than the tip of the skirt 6d.

The upper cup 7 includes a thick portion 7a extended radially inward by an inner cylindrical portion 7b, from the inner bottom 7c of the thick portion 7a. The inner cylindrical portion 7b may extend axially downward by an inner skirt 7d, from its inner extremity. The inner skirt 7d includes a flange 7e comprising a frusto-conical surface 7f facing downward and a cylindrical flange 7g extending radially outward, the flange 7e cooperating with the flange 6g. In particular, the external diameter of the cylindrical flange 7g is greater than the internal diameter of the cylindrical flange 6m, thus keeping the rolling bearing 1 assembled. The upper cup 7 includes an inner radial surface 7h oriented toward the lower cup 6, and connecting the inner cylindrical portion 7b to a toroidal internal surface 7i having, in cross section, a concave profile oriented toward the lower cup 6. The upper cup 7 also includes an outer skirt 7j extending axially downward to the cylindrical portion 6b. The upper cup 7 also includes a skirt 7k extending axially downward and partly inserted within the lower groove 6e of the lower cap 6. The upper cup 7 includes an upper groove 7m, formed between the skirt 7k and the outer skirt 7j, and within which the skirt 6d is partly inserted.

Moreover, the tip of the outer skirt 7j may be as high as, higher or lower than the tip of the skirt 7k. The upper cup 7 comprises an outer radial surface 7n oriented toward the lower cup 6, and connecting the skirt 7k to the toroidal internal surface 7i. Furthermore, the tip of the skirt 6d may be as high as, lower or higher than the level of the outer radial surface 7n.

The internal skirt 6f, the skirt 7k, the lower groove 6e, the skirt 6d, the upper groove 7m and the outer skirt 7j define a sinuous chamber 8. The sinuous chamber 8 forms an extension, extending radially outward, from an internal space 10 defined by the upper cup 7 and the lower cup 6, and comprising the upper ring 2 and the lower ring 3. In particular, the internal space 10 is defined by the outer radial surface 7n, the internal surface 7i, the inner radial surface 7h, the axial surface crossing the flange 6g, the internal surface 6i, the radial surface 6j and the axial surface crossing the tip of the internal skirt 6f.

The sinuous chamber 8 may comprise a first bend 8a defined by an axial surface crossing the tip of the internal skirt 6f, by the outer radial surface 7n, by the skirt 7k, and by a radial surface crossing the tip of the internal skirt 6f. Thus, the first bend 8a is formed by the tip of the skirt 6f and by the base of the skirt 7k. The first bend 8a is the part of the sinuous chamber 8 contacting the internal chamber. The sinuous chamber 8 also comprises a second bend 8b defined by the lower groove 6e and by a radial surface crossing the tip of the skirt 7k, and a third bend 8c defined by the upper groove 7m and by a radial surface crossing the tip of the skirt 6d. The first and second bends are separated by a first arm 8d. The first arm 8d is defined by the internal skirt 6f, the skirt 7k, the radial surface crossing the tip of the internal skirt 6f and the radial surface crossing the tip of the skirt 7k. The second and third bends are separated by a second arm 8e. The second arm 8e is defined by the skirt 7k, the skirt 6d, the radial surface crossing the tip of the skirt 7k and the radial surface crossing the tip of the skirt 6d. The sinuous chamber 8 also comprises a third arm 8f defined by the skirt 6d, the outer skirt 7j, a radial surface crossing the tip of the skirt 6d, and a radial surface crossing the tip of the outer skirt 7j. Thanks to the bends and arms, the sinuous chamber 8 acts as a labyrinth seal. In particular, the sinuous chamber 8 reduces the circulation of a liquid (for instance water), from the exterior to the internal chamber.

The sinuous chamber 8 may thus comprise two loops: one comprising the first arm 8d, the second bend 8b and the second arm 8e, and the other comprising the second arm 8e, the third bend 8c and the third arm 8f. However, it is also possible to form a sinuous chamber comprising only one loop, or more than two loops.

The cylindrical portion 6b is not compulsary but allows the formation of a bend at the end of the sinuous chamber 8. In particular, the bend is defined by the tip of the outer skirt 7j and by the upper surface of the cylindrical portion 6b, and also reduces the circulation of water.

The sinuous chamber 8, is at least partly, filled with a waterproof grease material 9. Thanks to the waterproof grease material and the sinuous chamber 8, the watertightness of the rolling bearing 1 is improved and the friction between the upper cup 6 and the lower cup 7 is reduced. In particular, in the first embodiment, the first bend 8a, the first arm 8d, the second bend 8b, the second arm 8e, the third bend 8c and the third arm 8f are filled with the waterproof grease material 9.

Moreover, according to this first embodiment, the waterproof grease material 9 also fills the internal space 10. The waterproof grease material 9 also allows the lubrication of the rolling bearing, in particular between the rolling elements 4 and the rings 2, 3 or the cage 5.

The waterproof grease material 9 may be introduced in the rolling bearing 1, after the assembling of the several parts described above. In particular, the waterproof grease material may be injected through the opening formed by the cylindrical portion 6b and the outer skirt 7j, in order to fill in the internal space 10 and the sinuous chamber 8, up to the passage formed by the two flanges 7e and 6g.

The penetration of a standardized cone according to the norm ISO 2137: 2007, in the waterproof grease material is of at most 295 1/10 mm, for an NLGI grade 2 waterproof grease.

The norm ISO 2137:2007 specifies several methods for the empirical estimation of the consistency of greases, by measuring the penetration of a standardized cone. In particular, the methods measure the penetration of a cone (weight: 102.5 g) in the grease, during 5 minutes, at 25° C. Thanks to such a value of penetration, the waterproof grease material 9 may stay in the sinuous chamber and keep the frictions between the upper cup and the lower cup of the rolling bearing at a low level.

In particular, the value of penetration of the grease may be chosen according to the oil forming the grease, or according to the proportion between oil and thickener. For instance, the use of a viscous oil in the grease, or the use of a larger amount of thickener in the grease may lead to a grease having a low value of penetration.

In addition to the hydrophobic properties of the oil forming the grease, the waterproof grease material may also contain waterproof additives in order to increase waterproofing of the grease. Such additives may be: PTFE (polytetrafluoroethylene), fluorine-based agent, silicone-based agent, calcium stearate, metal soap, as defined for instance in US 2008/0219610.

The embodiment illustrated in FIG. 2 is similar to the rolling bearing of FIG. 1, with the only difference that the waterproof grease material 9 does not fill entirely the sinuous chamber 8 and does not fill the internal space 10. In particular, the waterproof grease material 9 may fill the first arm 8d, the second bend 8b, the second arm 8e, the third bend 8c and the third arm 8f of the sinuous chamber 8, leaving empty the first bend 8a.

The internal space 10 may be filled with lubricating grease 11 which is different from the waterproof grease material 9. In this case, the lubricating grease 11 may be disposed in the internal space 10 before the assembling of the upper cup 7 and lower cup 6 of the rolling bearing 1, while the waterproof grease material 9 may be introduced in the rolling bearing 1, after the assembling of the several parts. However, it is also possible to place both the lubricating grease and the waterproof grease before assembling the two cups 6, 7 of the rolling bearing 1.

The embodiment illustrated in FIG. 3 is similar to the rolling bearing of FIG. 2, with the only difference that the waterproof grease material 9 may only fill the first arm 8d, the second bend 8b and the second arm 8e of the sinuous chamber 8, leaving empty the first bend 8a, the third bend 8c and the third arm 8f.

Thanks to the combination of both waterproof grease material and the sinuous chamber, the waterproofing of the rolling bearing is improved. Moreover, the lack of contacting lips allows a reduction of the friction between the upper cup and the lower cup. The rolling bearing may also be reversed and, more generally, the form of the sinuous chamber may be changed or adapted, as long as it acts as a labyrinth seal. Finally, it is also possible to provide lips, for instance between the outer skirt and the cylindrical portion, in order to improve the watertightness of the rolling bearing.

The invention claimed is:

1. A rolling bearing comprising:
a lower annular cup,
an upper annular cup,
a lower ring mounted inside a the lower annular cup,
an upper ring mounted inside an the upper annular cup,
at least one row of rolling elements positioned between raceways defined by the lower and upper rings, wherein the upper cup and the lower cup define an internal space and a sinuous chamber, the upper ring and the lower ring being located within the internal space, and
a lubricating grease material positioned only within the internal space;
wherein one of the lower and upper annular cups has at least one annular skirt and the other one of the lower and upper annular cups has at least one annular groove, the annular skirt being partly inserted within the at least one annular groove so as to form the sinuous chamber, the sinuous chamber being outside of and extending radially outwardly from the internal space;
a waterproof grease material having a different composition from and a greater viscosity than the lubricating grease material, the waterproof grease material being positioned solely within the sinuous chamber.

2. The rolling bearing according to claim 1 wherein a first bend in the sinuous chamber adjacent to the internal space facilitates maintaining the separation of the lubricating grease material from the waterproof grease material.

3. The rolling bearing according to claim 2 wherein one of the lower and upper annular cups includes a first flange extending radially inwardly toward an inner skirt of the other one of the lower and upper cups, the inner skirt including a second flange extending radially outwardly and cooperating with the first flange to keep the rolling bearing assembled.

4. The rolling bearing according to claim 1 wherein one of the lower and upper annular cups includes a radially-outwardly extending cylindrical portion and the other one of the lower and upper annular cups includes an outer skirt extending axially toward the cylindrical portion and radially limiting the sinuous chamber, the cylindrical portion and the outer skirt defining an opening of the sinuous chamber.

5. The rolling bearing according to claim 4 wherein one of the lower and upper annular cups includes an internal skirt extending axially toward the other one of the lower and upper annular cups and partly separating the sinuous chamber from the internal space.

6. The rolling bearing according to claim 5 wherein the waterproof grease material fills the sinuous chamber from the extremity of the outer skirt to the extremity of the internal annular skirt.

7. The rolling bearing according to claim 1 wherein the lubricating grease material lubricates the raceways of the upper and lower rings.

8. A thrust bearing assembly for a vehicle suspension, the thrust bearing comprising:
a lower annular cup,
an upper annular cup,
a lower ring mounted inside the lower annular cup,
an upper ring mounted inside the upper annular cup,
at least one row of rolling elements positioned between raceways defined by the lower and upper rings, wherein the upper cup and the lower cup define an internal space and a sinuous chamber, the upper ring and the lower ring being located within the internal space, and
a lubricating grease material positioned only within the internal space;

wherein one of the lower and upper annular cups has at least one annular skirt and the other one of the lower and upper annular cups has at least one annular groove, the annular skirt being partly inserted within the at least one annular groove so as to form the sinuous chamber, the sinuous chamber being outside of and extending radially outwardly from the internal space;

a waterproof grease material having a different composition from and a greater viscosity than the lubricating grease material, the waterproof grease material being positioned solely within the sinuous chamber.

\* \* \* \* \*